M. J. WINE.

FILE BOX.

No. 10,737. Reissued June 15, 1886.

Witnesses:
John L. Hankel
J. Campbell.

Inventor:
M. J. Wine.
by
Foster & Freeman
Attys

N. PETERS, Photo-Lithographer, Washington, D. C.

M. J. WINE.
FILE BOX.
No. 10,737. Reissued June 15, 1886.
Fig. 5.
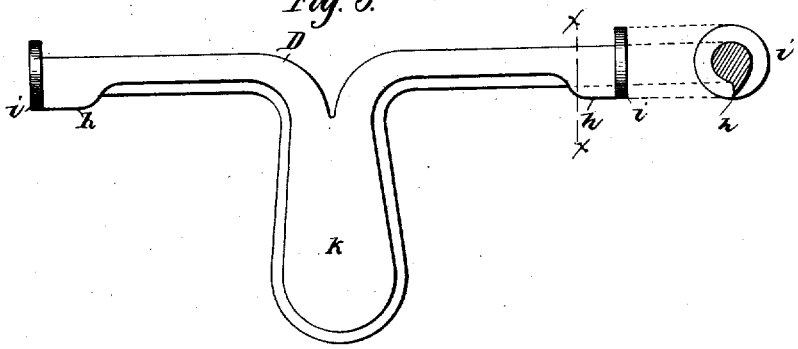
Fig. 6.
Fig. 4.
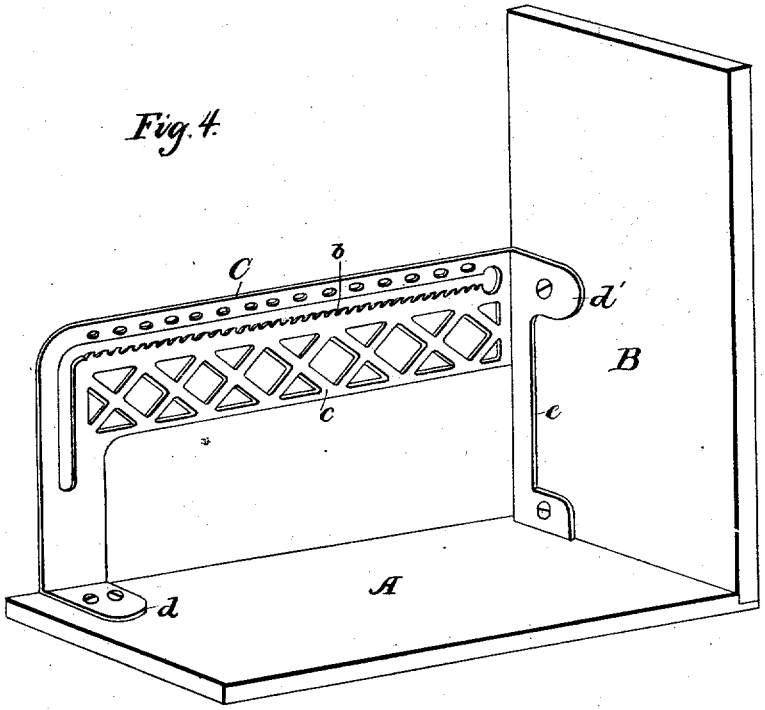
Witnesses:
John G. Hinkel
Josephine Campbell.
Inventor:
M. J. Wine.
by
Foster & Freeman
attys
N. PETERS, Photo-Lithographer, Washington, D. C.

UNITED STATES PATENT OFFICE.

MILETUS J. WINE, OF WASHINGTON, DISTRICT OF COLUMBIA.

FILE-BOX.

SPECIFICATION forming part of Reissued Letters Patent No. 10,737, dated June 15, 1886.

Original No. 290,615, dated December 18, 1883. Application for reissue filed December 26, 1883. Serial No. 115,664.

*To all whom it may concern:*

Be it known that I, MILETUS J. WINE, of the city of Washington, in the District of Columbia, have invented certain new and useful Improvements in File-Boxes; and I do hereby declare the following to be a full, clear, and exact description of the invention, that will enable others skilled in the art to which it appertains to make and use the same, reference being had to the accompanying drawings, and to the letters of reference marked thereon, which form a part of this specification.

This invention relates to certain improvements in holders for paper, files, documents, &c., especially of that class known as the "Duryee" file-box; and the objects of the present invention are to improve the construction of the same, to readily and quickly adjust the parts for union with little or no fitting, and to provide the follower with a cross-bar, preferably weighted and formed with projections to engage automatically the notches of the side bars and form a lock.

Figure 1:
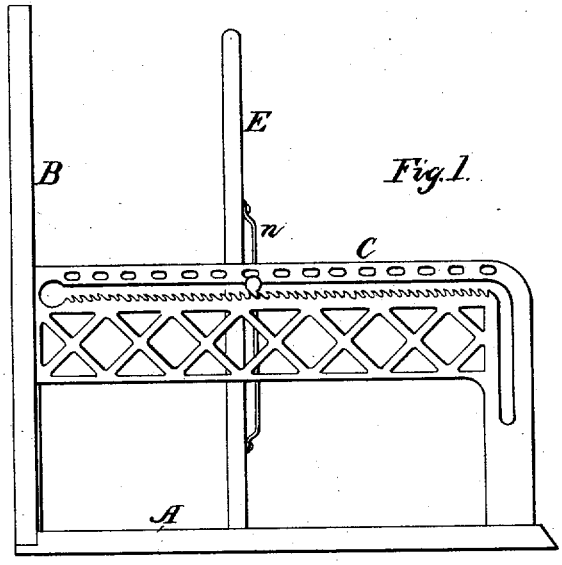
Figure 2:
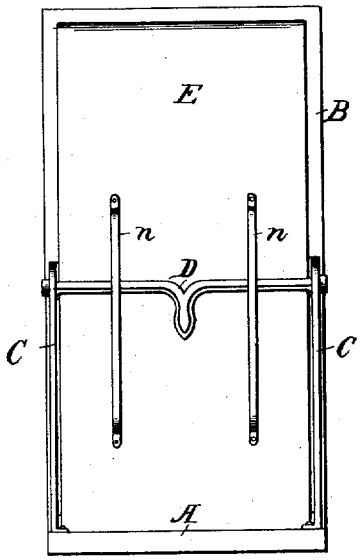
Figure 3:
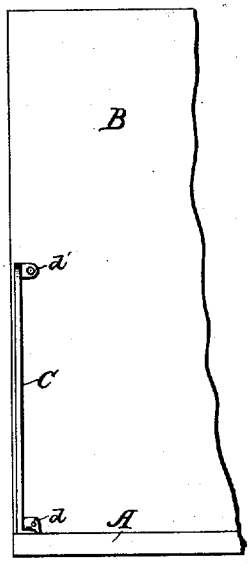

In the accompanying drawings, Figure 1 is a side view of my improved paper-file. Fig. 2 is a rear view of the same. Fig. 3 is a rear view of a portion of the end board with one of the side pieces in position. Fig. 4 is a view in perspective showing the base and end boards with one of the slotted side pieces, to show more fully the mode of connecting the parts without special fitting. Fig. 5 is a view of the weighted cross-bar, and Fig. 6 is a sectional view taken through the line *x x* of Fig. 5.

In the drawings, A represents the base-board, and B the end board, united at their meeting ends in the usual manner, and further connected so as to be sustained in a relative position to each other by the side pieces, C C, as shown in the drawings. The side pieces, C, are formed with combined longitudinal and vertical slots, the lower longitudinal portion of the slots being provided with ratchet-teeth or notches *b*, for the purpose hereinafter stated, and widened to constitute a wide bar, *c*, to provide additional vertical side surface to prevent sidewise displacement of the papers, &c., in the holder. These side pieces are also formed at the ends with flanges *d d'*, extending inward, and arranged at right angles to the body or sides of the pieces to receive the securing screws or rivets. The flange *d'* at the inner end of the side piece for attachment to the end board is prolonged, as indicated by the letter *e*, so as to be at the end on the same plane with the base of the rear flanges, so that in fitting the side piece to the base and end boards the base of the inner flange, as well as the rear flange, will rest on the base-board. By thus providing the side pieces with flanges at the opposite ends adapted to fit against the faces of the bottom and end boards arranged at right angles to each other, and by extending the flange *d'* so that its end is on the same plane as the face of the flange *d*, the side pieces become gages, whereby the boards are set without other measurement in proper relative position, and whereby they are then secured by merely bolting each board to the adjacent flange without any cutting or scoring or other fitting of the boards to the connecting-pieces. The time and labor required for fitting the parts are thus greatly reduced, with a corresponding saving in the cost of manufacture.

The letter D (see Fig. 5) represents a cross-bar to engage and co-operate with the ratchet-teeth of the side pieces of the holder. This cross-bar is provided near each end with radial projections or extensions *h*, and the extreme ends with disks or buttons *i*, and at the central portion with an arm or finger-lever, *k*, preferably of such weight as to normally retain the projection of the cross-bar in engagement with the notches or ratchet-teeth of the side pieces. This cross-bar as constructed is attached to the follower E by means of staples, hinges, or other fastening means, *n*, in such manner as to permit of a slight vertical movement and an oscillating motion to the cross-bar.

The parts of the holder being brought together and properly adjusted, the operation in adjusting the follower is as follows: The finger-lever of the cross-bar is elevated to raise the projections from the ratchet-teeth of the side pieces, and by withdrawing the cross-bar, with its attached follower, rearward a short distance a space will be formed for the insertion of papers or the like between the end board and the follower; or, if desired, the cross-bar, with the attached follower, can be withdrawn entirely back, so that the cross-bar can fall into the vertical slot and there rest, with the follower tilted at an angle. After the papers, documents, &c., have been inserted and arranged in the holder the cross-bar is again elevated and moved forward with the follower until it (the follower) is arrested by coming in contact with the papers, when by a slight pressure the desired compression on the papers is secured. Then, by dropping the lever of the cross-bar the projections will engage with a set of the ratchet-teeth of the opposite side pieces, and the ends of the bar are wedged in the slots with a cam-like action to thereby automatically lock the follower against the papers; also, after the papers have been inserted, by tilting the holder to send it home into the cell in the case, the follower, with the cross-bar, will automatically move forward by its own weight, and the weighted lever of the cross-bar will automatically cause the projections on the cross-bar to engage with the ratchet-teeth of the side pieces and form a lock, and thus fasten the papers in position. The finger-lever of the cross-bar is sufficiently weighted to cause it to drop, and thereby effectually lock the follower against displacement. To open the file and release the papers the arm of the cross-bar is lifted, which releases the projections from engagement with the ratchet-teeth, and as soon as thus released the pressure or elasticity of the contents of the file force the follower back, or it may be drawn back by the arm of the cross-bar to such a distance as affords ready and convenient access to the file.

The cross-bar may be provided at the inner ends of the extensions with rings, so as to form a collar to sustain the direct transverse position of the cross-bar between the side pieces, and in some cases both outer and inner rings may be formed at the edge of the extensions to produce the result herein stated.

I am aware that file-boxes having bottom and end boards have been provided with side bars or guides and with followers and cross-bars and means whereby the cross-bars are automatically clamped to the guides. My invention is distinguished from such devices by the facts that my cross-bar and locking means consist of one single piece, and I am enabled by simply grasping the arm of the cross-bar to either wedge the cam ends thereof in the slots of the side pieces or to unlock the same to permit free and ready adjustment of the follower. I thus dispense with the springs and supplemental pieces heretofore required, and avoid the expense of constructing and fitting the same.

My invention is further distinguished by the fact that by tilting the box the cross-piece is automatically either locked or unlocked from the guides, while in those referred to a direct manipulation of the parts is always necessary. Moreover, in such devices the follower is never free to move unless the hand is applied to release the clamping means, whereas in my device the follower is absolutely free until the cams are wedged in the slots.

What I claim as my invention, and desire to secure by Letters Patent, is—

1. As an improved article of manufacture, the holder for papers, &c., consisting of the base-board, end board, slotted side piece with end flanges, *d e*, the follower, and weighted cross bars, said parts being combined and organized as described.

2. A file-box provided with end and bottom boards, slotted notched side pieces, a follower, and an attached cross-piece having a projecting arm and with cam-shaped ends extending into the slots, substantially as set forth.

3. The combination, in a file-box, of end and bottom boards, side pieces, each having a longitudinal slot with teeth at one edge, a follower, and a cross-piece carried by the follower, provided with an arm and with cam-shaped ends, arranged as set forth, that the ends may be wedged in the slots by the act of turning the cross-piece, substantially as specified.

In testimony whereof I affix my signature in presence of two witnesses.

MILETUS J. WINE.

Witnesses:

L. C. YOUNG,

CHARLES E. FOSTER.